(12) United States Patent
Shih et al.

(10) Patent No.: US 10,275,163 B2
(45) Date of Patent: Apr. 30, 2019

(54) METHODS FOR CONTROLLING DATA TRANSFER SPEED OF A DATA STORAGE DEVICE AND A HOST DEVICE UTILIZING THE SAME

(71) Applicant: Silicon Motion, Inc., Jhubei, Hsinchu County (TW)

(72) Inventors: Fu-Jen Shih, New Taipei (TW); Yen-Hung Chen, Taichung (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 45 days.

(21) Appl. No.: 15/820,727

(22) Filed: Nov. 22, 2017

(65) Prior Publication Data
US 2018/0157417 A1    Jun. 7, 2018

Related U.S. Application Data

(60) Provisional application No. 62/430,971, filed on Dec. 7, 2016.

(30) Foreign Application Priority Data

Apr. 13, 2017   (TW) .............................. 106112348 A

(51) Int. Cl.
*G06F 13/10* (2006.01)
*G06F 3/06* (2006.01)
(Continued)

(52) U.S. Cl.
CPC ............ *G06F 3/061* (2013.01); *G06F 3/0625* (2013.01); *G06F 3/0634* (2013.01);
(Continued)

(58) Field of Classification Search
CPC .................................. G06F 3/061; G06F 13/42
(Continued)

(56) References Cited

U.S. PATENT DOCUMENTS 6,219,300 B1 *  4/2001  Tamaki ................... G11C 7/06
                                                       365/189.07
7,215,984 B2    5/2007  Diab et al.
(Continued)

FOREIGN PATENT DOCUMENTS

CN        102156529 A      8/2011
CN        103106118 A      5/2013
(Continued)

*Primary Examiner* — Jae U Yu
(74) *Attorney, Agent, or Firm* — McClure, Qualey & Rodack, LLP

(57) ABSTRACT

A host device coupled to a data storage device via a predetermined interface includes a processor and a signal processing device. The processor accesses data stored in the data storage device via the predetermined interface. The signal processing device performs signal processing on the data. The processor transmits a first power mode change request packet to the data storage device via the predetermined interface, to request to change a data transfer speed of the predetermined interface from a first speed to a second speed. The processor receives a first power mode change confirm packet via the predetermined interface from the data storage device, and in response to the first power mode change confirm packet, the processor determines to keep the data transfer speed at the first speed and does not change the data transfer speed to the second speed.

14 Claims, 7 Drawing Sheets

(51) Int. Cl.
*G06F 9/4401* (2018.01)
*G06F 13/42* (2006.01)

(52) U.S. Cl.
CPC .......... *G06F 3/0679* (2013.01); *G06F 9/4405* (2013.01); *G06F 13/42* (2013.01)

(58) Field of Classification Search
USPC ........................................................ 711/103
See application file for complete search history.

(56) References Cited

U.S. PATENT DOCUMENTS

2009/0161799 A1  6/2009  Fisher-Jeffes
2014/0307827 A1  10/2014 Liu et al.

FOREIGN PATENT DOCUMENTS

| CN | 104391816 A | 3/2015 |
|---|---|---|
| TW | 200715129 A | 4/2007 |
| TW | 200943845 A | 10/2009 |
| TW | 201039138 A | 11/2010 |
| TW | 201243711 A | 11/2012 |

\* cited by examiner

METHODS FOR CONTROLLING DATA TRANSFER SPEED OF A DATA STORAGE DEVICE AND A HOST DEVICE UTILIZING THE SAME

CROSS REFERENCE TO RELATED APPLICATIONS

This Application claims the benefit of U.S. Provisional Application No. 62/430,971 filed Dec. 7, 2016 and entitled "Data Storage Device and Operating Method Thereof", the entire contents of which are hereby incorporated by reference.

This Application also claims priority of Taiwan Patent Application No. 106112348, filed on Apr. 13, 2017, the entirety of which is incorporated by reference herein.

BACKGROUND OF THE INVENTION

Field of the Invention

The invention relates to a method for controlling the data transfer speed of a device, so as to avoid problems of data processing congestion, transmission suspension, or any unexpected access errors due to an improper data transfer speed setting.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access efficiency of the data storage device, a novel method for controlling data transfer speed of the data storage device is provided, which can not only efficiently control the data transfer speed of the data storage device, but also avoid problems with data processing congestion, transmission suspension, or any unexpected access errors due to improper data transfer speed settings.

BRIEF SUMMARY OF THE INVENTION

A host device and methods for controlling the data transfer speed of a data storage device are provided. An exemplary embodiment of a host device coupled to a data storage device via a predetermined interface comprises a processor and a signal processing device. The processor accesses data stored in the data storage device via the predetermined interface. The signal processing device performs signal processing on the data. The processor transmits a first power mode change request packet to the data storage device via the predetermined interface, to request to change a data transfer speed of the predetermined interface from a first speed to a second speed. The processor receives a first power mode change confirm packet via the predetermined interface from the data storage device, and in response to the first power mode change confirm packet, the processor determines to keep the data transfer speed at the first speed and does not change the data transfer speed to the second speed.

An exemplary embodiment of a method for controlling the data transfer speed comprises: transmitting, by a processer, a first power mode change request packet to a data storage device via a predetermined interface, to request the data storage device to change the data transfer speed of the predetermined interface from a first speed to a second speed; receiving, by the processor, a first power mode change confirm packet via the predetermined interface from the data storage device; and in response to the first power mode change confirm packet, keeping the data transfer speed at the first speed and not changing the data transfer speed to the second speed.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
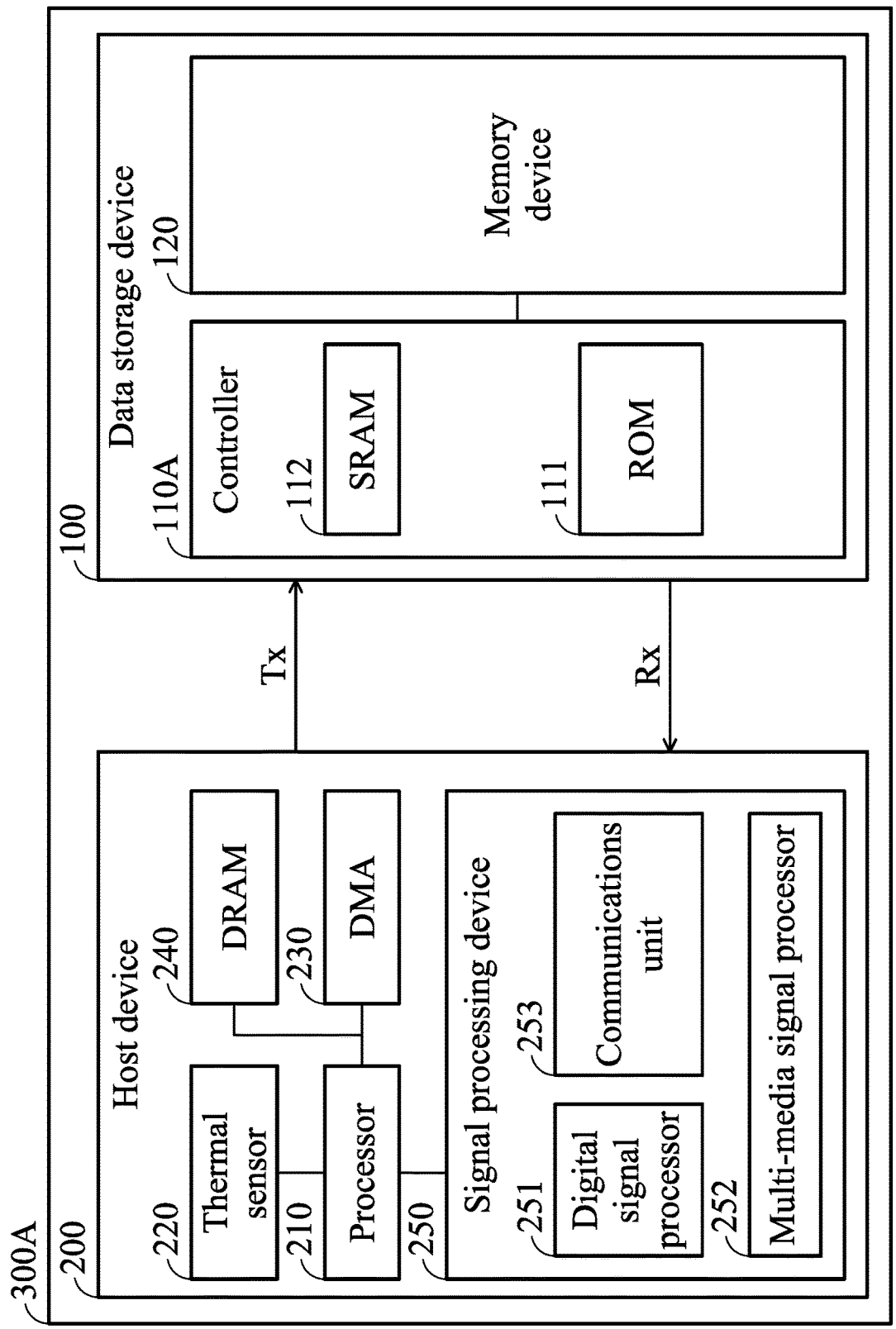
FIG. 1A shows an exemplary block diagram of an electronic device according to an embodiment of the invention.

FIG. 1A shows an exemplary block diagram of an electronic device according to an embodiment of the invention. The electronic device 300A may comprise a data storage device 100 and a host device 200. The data storage device 100 may comprise a controller 110A and a memory device 120. The controller 110A may comprise a Read Only Memory (ROM) 111 and a Static Random Access Memory (SRAM) 112. The memory device 120 may comprise one or more non-volatile memory devices such as a flash memory.

The host device 200 may at least comprise a processor 210, a thermal sensor 220, a Direct Memory Access (DMA) device 230, a Dynamic Random Access Memory (DRAM) 240 and a signal processing device 250. The thermal sensor 220 is configured to sense ambient temperature to obtain a sensed temperature and provide the sensed temperature to the processor 210. The DMA device 230 and the DRAM 240 are coupled to the data storage device 100 for transferring or buffering the data to be written to or read from the data storage device 100. The signal processing device 250 may comprise a plurality of different hardware devices for performing signal processing, such as a digital signal processor 251, a multi-media signal processor 252 and one or more communications units 253. The communications unit 253 may provide wired or wireless communications service. The communications unit 253 may comprise, for example, a radio transceiver, an antenna module and a modulator-demodulator (MODEM) (not shown), and may provide the wired or wireless communications service in compliance with a predetermined communications protocol. The signal processing device 250 may also perform signal processing on the data accessed by the processor 210. The processor 210 may control the operations of the components in the host device 200.

The host device 200 may be coupled to the data storage device 100 via a predetermined interface. The processor 210 may access data stored in the data storage device 100 via the predetermined interface. For example, when the data storage device 100 comprises one or more Universal Flash Storage (UFS), the host device 200 may be coupled to the data storage device 100 via the UFS interface. As shown in FIG. 1A, the UFS interface may comprise a transmission path TX to transmit commands and data to the data storage device 100 and a reception path RX to receive command and data from the data storage device 100.

Figure 1B:
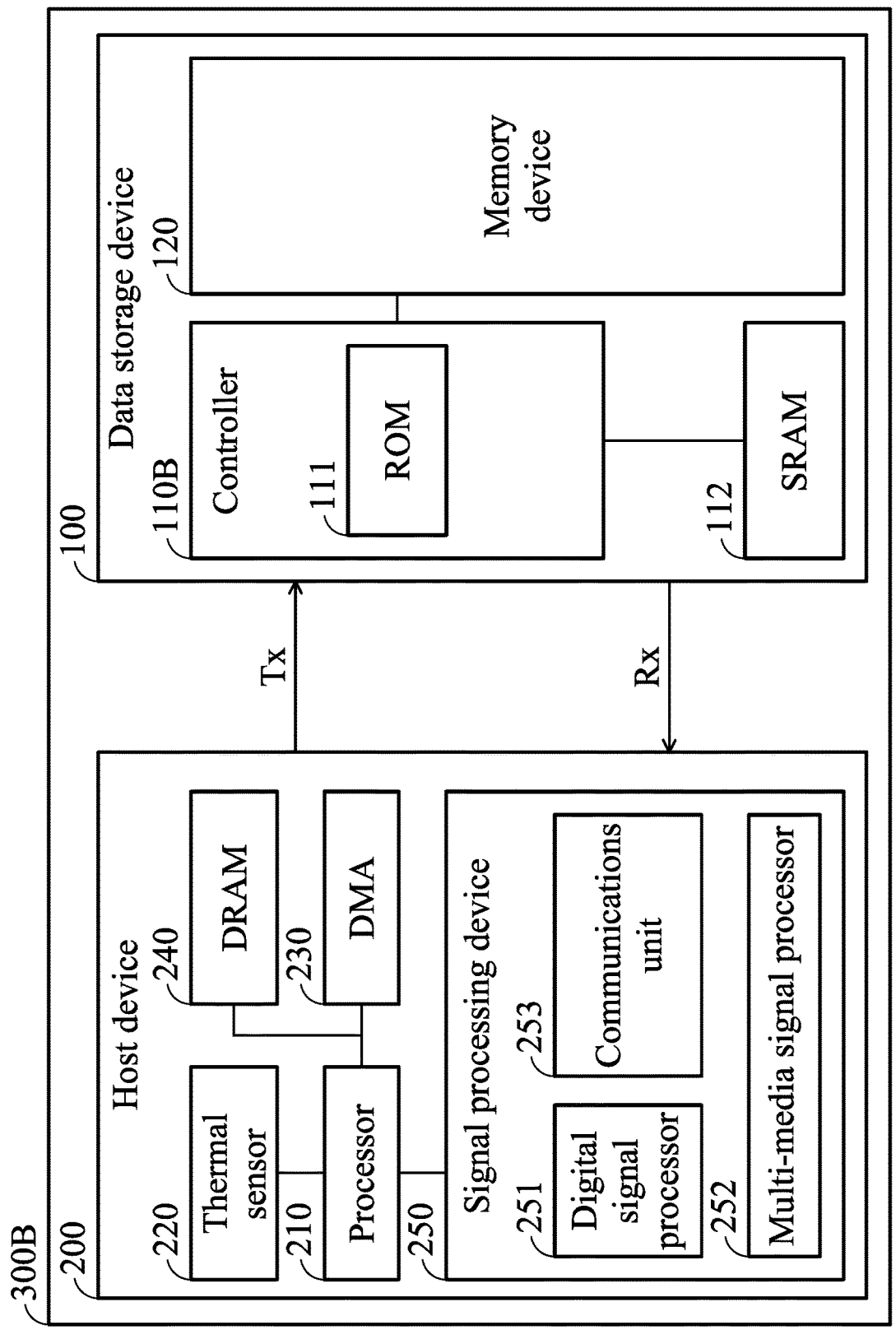
FIG. 1B shows an exemplary block diagram of an electronic device according to another embodiment of the invention.

FIG. 1B shows a block diagram of an electronic device according to another embodiment of the invention. In this embodiment, the SRAM 112 is configured outside of the controller 110B and is coupled to the controller 110B.

Note that for simplicity, FIG. 1A and FIG. 1B presents a simplified block diagram, in which only the elements relevant to the invention are shown, and FIG. 1A and FIG. 1B merely show two of a variety of structures to implement the invention. However, the invention should not be limited the structures and components shown in FIG. 1A and FIG. 1B.

As described above, the host device 200 and the data storage device 100 may be coupled to each other via the predetermined interface (such as the UFS interface). The host device 200 may transmit a power mode change request packet to the data storage device 100 for setting the data transfer speed of the predetermined interface.

Figure 2:
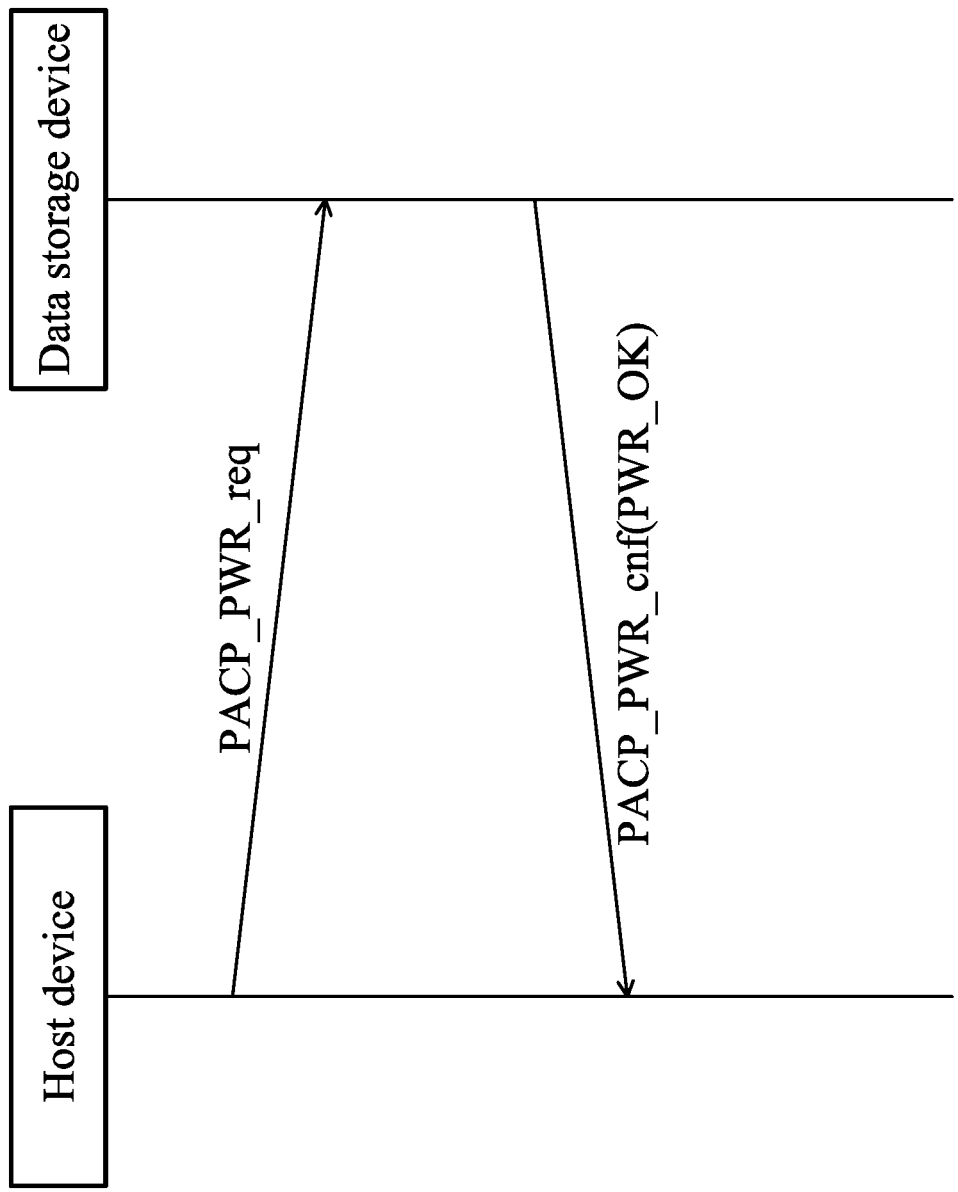
FIG. 2 shows an exemplary message flow for setting the data transfer speed of the predetermined interface according to an embodiment of the invention.

FIG. 2 shows an exemplary message flow for setting the data transfer speed of the predetermined interface according to an embodiment of the invention. The host device (for example, the processor 210) may transmit a power mode change request packet PACP_PWR_req to the data storage device. Upon receiving the power mode change request packet PACP_PWR_req, the data storage device (for example, the controller 110A or 110B) may reply a power mode change confirm packet PACP_PWR_cnf to the host device via the predetermined interface. When the process ends, the host device and the data storage device may use the data transfer speed indicated in the power mode change request packet PACP_PWR_req for data transmission.

According to an embodiment of the invention, the data transfer speed may comprise a transmission speed for the host device to transmit data to the data storage device and a reception speed for the host device to receive data from the data storage device. The power mode change request packet may comprise a TX speed field (TXGear) for setting the transmission speed and an RX speed field (RXGear) for setting the reception speed.

According to an embodiment of the invention, the transmission/reception speed of the UFS interface may be defined by two modes, comprising a power change mode (PWM) and a high speed mode (HS). The PWM mode further defines eight levels of speed, comprising PWM_G0~PWM_G7. The PWM_G0 defines the maximum transmission/reception speed as 3 Mbps, and the minimum transmission/reception speed as 0.01 Mbps. The PWM_G1 defines the maximum transmission/reception speed as 9 Mbps, and the minimum transmission/reception speed as 3 Mbps. The PWM_G2 defines the maximum transmission/reception speed as 18 Mbps, and the minimum transmission/reception speed as 6 Mbps. The PWM_G3 defines the maximum transmission/reception speed as 36 Mbps, and the minimum transmission/reception speed as 12 Mbps. The PWM_G4 defines the maximum transmission/reception speed as 72 Mbps, and the minimum transmission/reception speed as 24 Mbps. The PWM_G5 defines the maximum transmission/reception speed as 144 Mbps, and the minimum transmission/reception speed as 48 Mbps. The PWM_G6 defines the maximum transmission/reception speed as 288 Mbps, and the minimum transmission/reception speed as 96 Mbps. The PWM_G7 defines the maximum transmission/reception speed as 576 Mbps, and the minimum transmission/reception speed as 192 Mbps.

The HS mode further defines six levels of speed, comprising HS-G1~HS-G3, A-series and HS-G1~HS-G3, B-series. The HS-G1 A defines the transmission/reception speed as 1248 Mbps. The HS-G1 B defines the transmission/reception speed as 1457.6 Mbps. The HS-G2 A defines the transmission/reception speed as 2496 Mbps. The HS-G2 B defines the transmission/reception speed as 2915.2 Mbps. The HS-G3 A defines the transmission/reception speed as 4992 Mbps. The HS-G3 B defines the transmission/reception speed as 5830.4 Mbps.

In existing designs, the data transfer speed of the predetermined interface can only be determined and controlled by the host device 200. When receiving the power mode change request packet PACP_PWR_req from the host device 200, the data storage device 100 usually has to accept the request and set a status field of the power mode change confirm packet PACP_PWR_cnf to request accept (PWR_OK). Then, the data storage device 100 transmits the power mode change confirm packet PACP_PWR_cnf back to the host device.

In existing designs, the data storage device 100 can refuse the power mode change request received from the host device 200 only when the situation regarding ability mismatch or the device failure, which makes the data storage device 100 being unable to support the required data transfer speed, has occurred. Here, the ability mismatch means that the software and hardware equipment of the data storage device 100 is actually unable to support the level of the speed assigned by the host device (that is, the level of the data transfer speed to be changed). In this situation, the data storage device 100 will set the status field of the power mode change confirm packet PACP_PWR_cnf to erroneous capability (PWR_ERROR_CAP) and transmits, back to the host device, the power mode change confirm packet PACP_PWR_cnf indicating that an ability mismatch or device failure has occurred.

When the host device 200 determines that device failure has occurred, the host device 200 may initiate a reboot process, for controlling the data storage device 100 to perform a reboot process and reestablish the connection with the data storage device 100.

However, when the ability of the data storage device 100 matches with (that is, is able to support) the level of data transfer speed assigned by the host device, but the data storage device 100 temporarily cannot support the level of data transfer speed assigned by the host device since the data storage device 100 is busy right now, it is quite improper to adjust the level of data transfer speed right away when receiving the power mode change request packet PACP_PWR_req. If, in the situation described above, the data storage device 100 changes the data transfer speed in response to the power mode change request packet PACP_PWR_req received from the host device 200, undesired data processing congestion, transmission suspension, or unexpected access errors may possibly occur.

In one example, when the data storage device 100 performs memory management, such as a garbage collection, moving a data block, or erasing data, in the background, some data throughput and transmission bandwidth will be occupied. At this time, if the data storage device 100 must unconditionally accept the power mode change request to increase the data transfer speed as long as the data storage device 100 is able to support the level of data transfer speed to be adjusted, undesired data processing congestion, transmission suspension, or unexpected access errors will occur when the remaining transmission bandwidth or the data throughput of the data storage device 100 is insufficient to cope with the higher data transfer speed.

In another example, when the utilization of the SRAM 112 of the data storage device 100 is higher than a predetermined buffer threshold, this means that the remaining memory space of the SRAM 112 may not be sufficient. At this time, if the data storage device 100 must unconditionally accept the power mode change request to decrease the data transfer speed as long as the data storage device 100 is able to support the level of data transfer speed to be adjusted, the speed for outputting the data stored in the SRAM 112 must be decreased accordingly. In this manner, the efficiency of accessing the data storage device 100 will be decreased as well.

To solve these problems, a method for controlling the data transfer speed is proposed. Unlike the conventional design in which the data storage device 100 must unconditionally accept and cannot refuse the power mode change request as long as the data storage device 100 has the ability to support the level of data transfer speed requested by the host device 200 to be adjusted, in the proposed method for controlling the data transfer speed, the data storage device 100 can determine whether to refuse or reject the power mode change request issued by the host device 200 first according to the current operation status, and then adjust the data transfer speed to the level as requested by the host device 200 later at some appropriate time. The proposed method for controlling the data transfer speed will be discussed in more detained in the following paragraphs.

Figure 3:
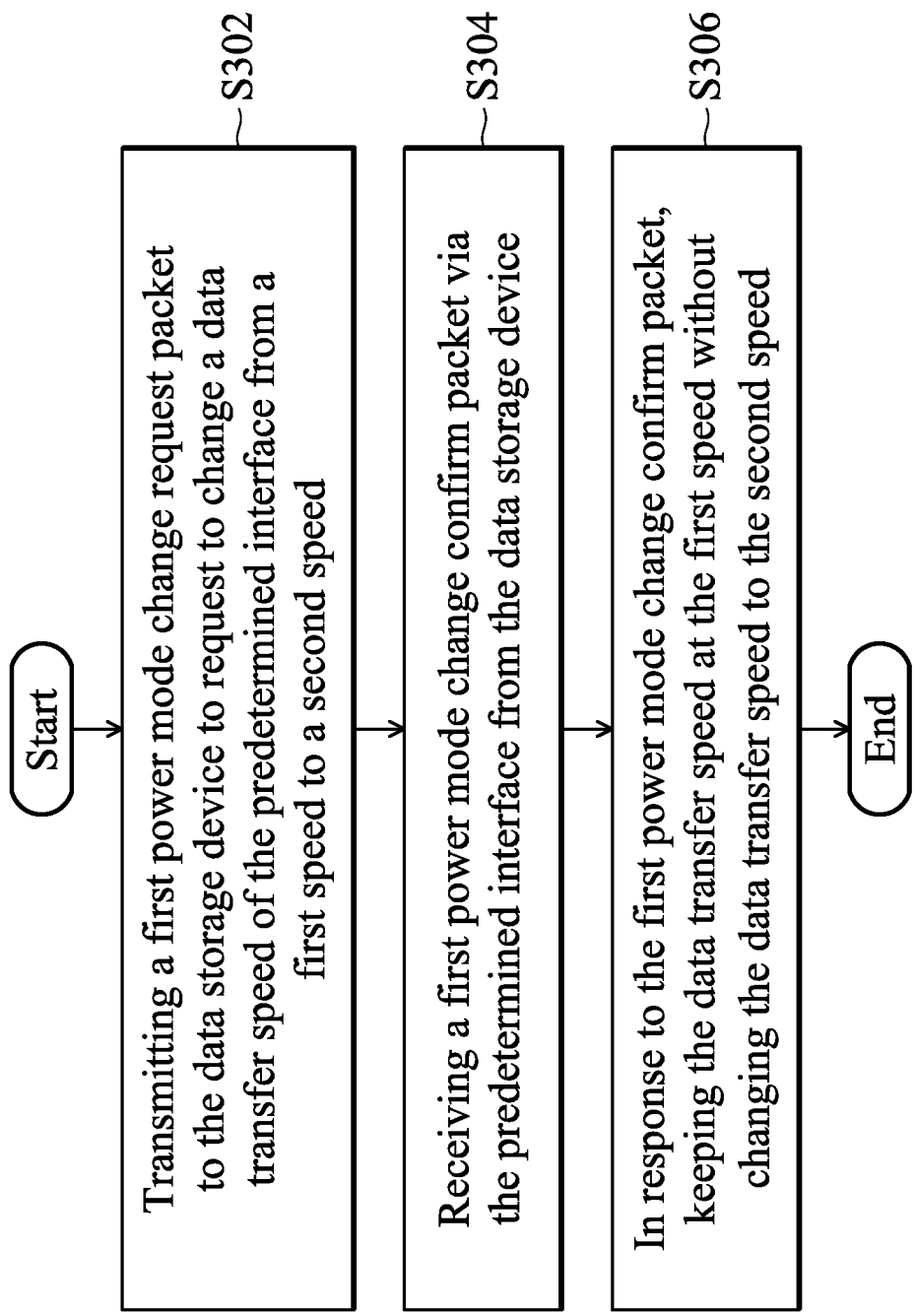
FIG. 3 is a diagram showing the flow chart of the method for controlling the data transfer speed according to an embodiment of the invention.

FIG. 3 is a diagram showing the flow chart of the method for controlling the data transfer speed according to an embodiment of the invention. The steps shown in FIG. 3 are performed by the processor 210 of the host device 200. First of all, when the processor 210 determines that there is a need to adjust the data transfer speed, the processor transmits a first power mode change request packet to the data storage device 100 via the predetermined interface, so as to request to change the data transfer speed of the predetermined interface from a first speed to a second speed (Step S302). Depending on different system requirements, the first speed may be higher than or lower than the second speed. Next, the processor 210 receives a first power mode change confirm packet via the predetermined interface from the data storage device 100 (Step S304). When the first power mode change confirm packet indicates that the data storage device 100 refuses to adjust the data transfer speed, the processor 210 determines to keep the data transfer speed at the first speed and does not change the data transfer speed to the second speed in response to the first power mode change confirm packet (Step S306). For example, when the processor determines that a status field in the first power mode change confirm packet is set to busy, the processor 210 determines to keep the data transfer speed at the first speed and does not change the data transfer speed to the second speed.

Figure 4:
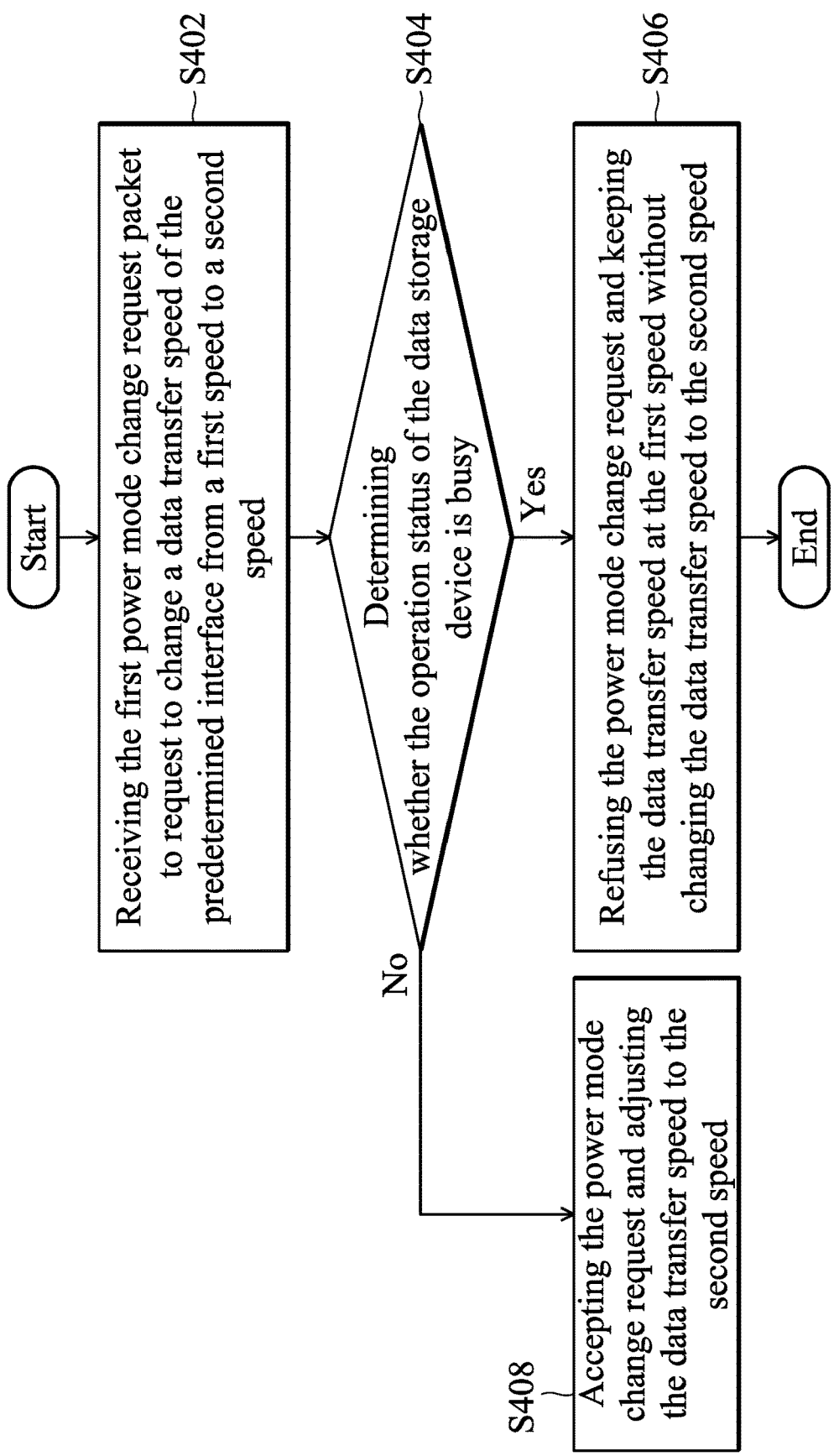
FIG. 4 is a diagram showing the flow chart of the method for controlling the data transfer speed according to an embodiment of the invention.

FIG. 4 is a diagram showing the flow chart of the method for controlling the data transfer speed according to an embodiment of the invention. The steps shown in FIG. 3 are performed by the controller 110A or 110B of the data storage device 100. First of all, the controller 110A/110B receives the first power mode change request packet from the host device 200 via the predetermined interface, wherein the first power mode change request packet indicates that the data storage device 100 is requested to adjust the data transfer speed of the predetermined interface from a first speed to a second speed (Step S402). Next, the controller 110A/110B determines whether the operation status of the data storage device 100 is busy (Step S404). If so, the controller 110A/110B determines to reject the power mode change request, and keeps the data transfer speed at the first speed without changing the data transfer speed to the second speed (Step S406). If not, the controller 110A/110B determines to accept the power mode change request, and adjusts the data transfer speed to the second speed (Step S408).

Figure 5:
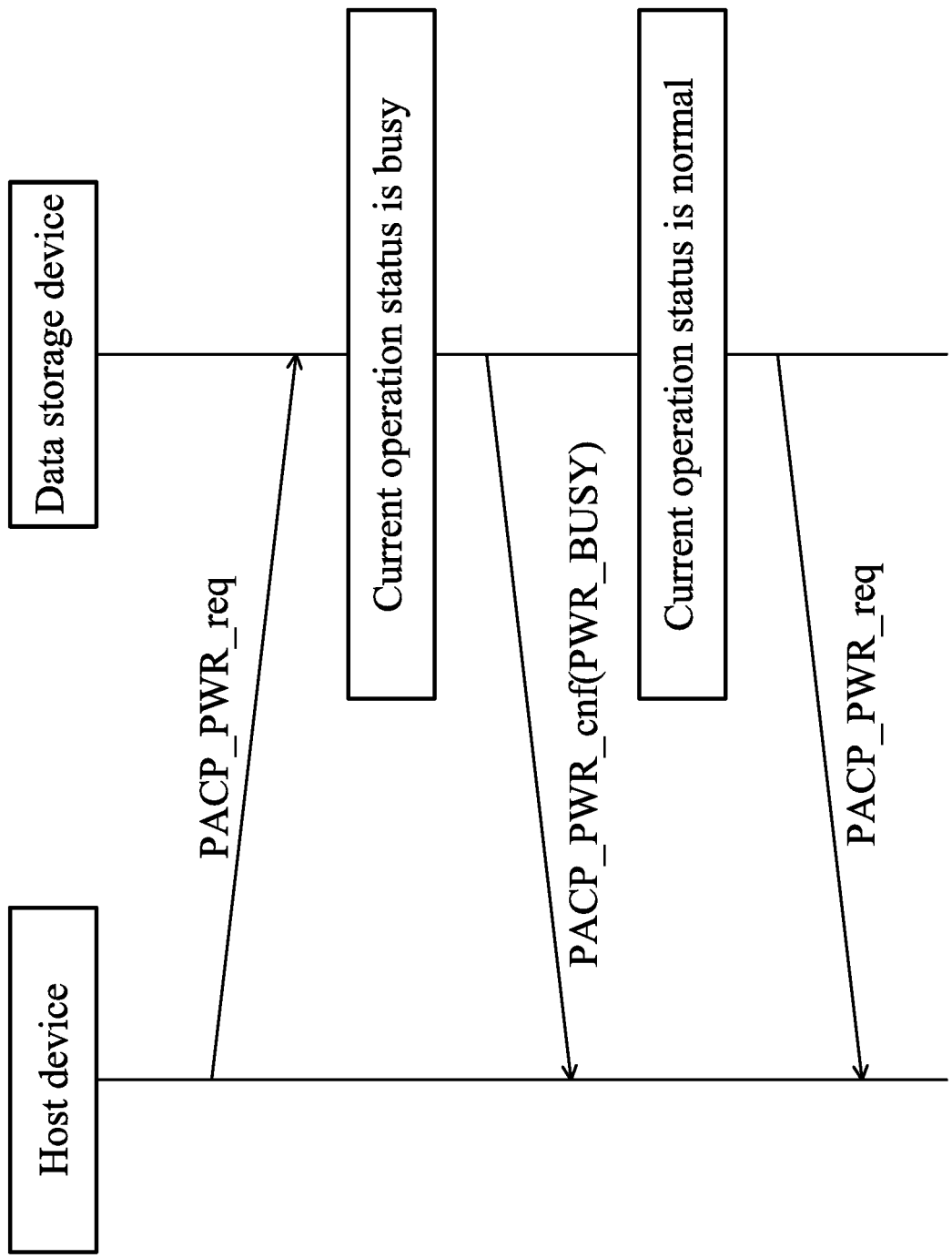
FIG. 5 shows an exemplary message flow for setting the data transfer speed of the predetermined interface according to an embodiment in a first aspect of the invention.

FIG. 5 shows an exemplary message flow for setting the data transfer speed of the predetermined interface according to an embodiment in a first aspect of the invention. First of all, the host device (for example, the processor 210) transmits a power mode change request packet PACP_PWR_req to the data storage device via the predetermined interface, to request to change the data transfer speed of the predetermined interface from a first speed to a second speed. For example, the processor 210 may determine to adjust the data transfer speed for transmitting data between the host device 200 and the data storage device 100 according to a temperature sensed by the thermal sensor 220 or a data processing speed required by the signal processing device 250.

Upon receiving the power mode change request packet PACP_PWR_req, the current operation status of the data storage device 100 is determined by the component in the data storage device 100 (e.g. by the controller 110A or 110B).

In an embodiment of the invention, the operation status of the data storage device 100 may comprise a normal status and a busy status. The controller 110A/110B may determine whether the operation status of the data storage device 100 is busy according to one or more of the buffer utilization (for example, the utilization of the SRAM 112), a remaining transmission bandwidth and a data throughput of the memory device 120.

In one example, when the buffer utilization (for example, the utilization of the SRAM 112) is higher than a predetermined buffer threshold (for example, half of the total capacity of buffer area of the SRAM 112), the controller 110A/110B may determine that current operation status of the data storage device 100 is busy. Otherwise, the controller 110A/110B may determine that the current operation status of the data storage device 100 is normal.

In another example, when the data storage device 100 performs memory management, such as a garbage collection, moving data block or erasing data, in the background, some data throughput and transmission bandwidth will be occupied. When the remaining transmission bandwidth or data throughput is insufficient for the higher data transfer speed (for example, lower than a remaining transmission bandwidth threshold or a data throughput threshold), the controller 110A/110B may determine that current operation status of the data storage device 100 is busy. Otherwise, the controller 110A/110B may determine that the current operation status of the data storage device 100 is normal.

Note that the controller 110A/110B may also dynamically adjust the predetermined buffer threshold, the remaining transmission bandwidth threshold, or the data throughput threshold. For example, the controller 110A/110B may determine the predetermined buffer threshold, the remaining transmission bandwidth threshold, or the data throughput threshold according to the content of the command queue stored in the SRAM 112, for example, according to the type of the command to be executed in the command queue.

In addition, note that the embodiment discussed above is only one of a variety of embodiments of the invention and the invention should not be limited thereto.

When the ability of the data storage device 100 matches with (that is, is able to support) the level of data transfer speed assigned by the host device 200 (that is, the second speed requested by the host device 200), but the current operation status of the data storage device 100 is busy, the controller 110A/110B may determine that the requested speed cannot be satisfied. The controller 110A/110B may transmit a power mode change confirm packet PACP_P-WR_cnf to the host device via the predetermined interface for responding to the power mode change request packet PACP_PWR_req.

In the power mode change confirm packet PACP_P-WR_cnf, the controller 110A/110B may set a status field thereof to busy (PWR_BUSY), so as to reject the request issued by the host device 200 for changing the data transfer speed.

In addition, according to an embodiment of the invention, the controller 110A/110B may store the data carried in the power mode change request packet PACP_PWR_req in the SRAM 112, and keep monitoring the operation status of the data storage device 100. For example, the controller 110A/110B may record the information of the flag field (Flags), the transmission power mode field (TxMode), the transmission line field (TxLand), the TX speed field (TXGear), the reception power mode field (RxMode), the reception line field (RxLand), the RX speed field (RXGear), etc. However, it should be noted that the invention should not be limited thereto. For example, the controller 110A/110B may also record all the content carried in the power mode change request packet PACP_PWR_req received from the host device 200 in the SRAM 112.

When the controller 110A/110B determines that the requested speed can be satisfied (for example, when the operation status of the data storage device 100 becomes normal), the controller 110A/110B may transmit another power mode change request packet to the host device 200 according to the information regarding the previously received power mode change request packet stored in the SRAM 112, so as to request to change the data transfer speed of the predetermined interface from the first speed to the second speed.

According to another embodiment of the invention, when the controller 110A/110B determines that the data storage device 100 can now operate at the speed requested by the host device, the controller 110A/110B may transmit another power mode change confirm packet PACP_PWR_cnf via the predetermined interface to the host device. In the power mode change confirm packet PACP_PWR_cnf, the status field of the power mode change confirm packet PACP_P-WR_cnf is set to request accept (PWR_OK), meaning that the data storage device 100 accepts the previous power mode change request.

As described above, in an embodiment of the invention, the data transfer speed may comprise a transmission speed for the host device to transmit data to the data storage device and a reception speed for the host device to receive data from the data storage device. Note that in the embodiments of the invention, the transmission speed and the reception speed request by the host device or the controller 110A/110B may be the same or different.

Besides the embodiment in the first aspect of the invention discussed above, in which the host device 200 passively waits for the data storage device 100 to notify when the data transfer speed requested by the host device 200 can be satisfied and the data transfer speed will not be adjusted until the host device 200 is notified, in the embodiment in the second aspect of the invention, the host device 200 may also actively query the operation status of the data storage device 100.

Figure 6:
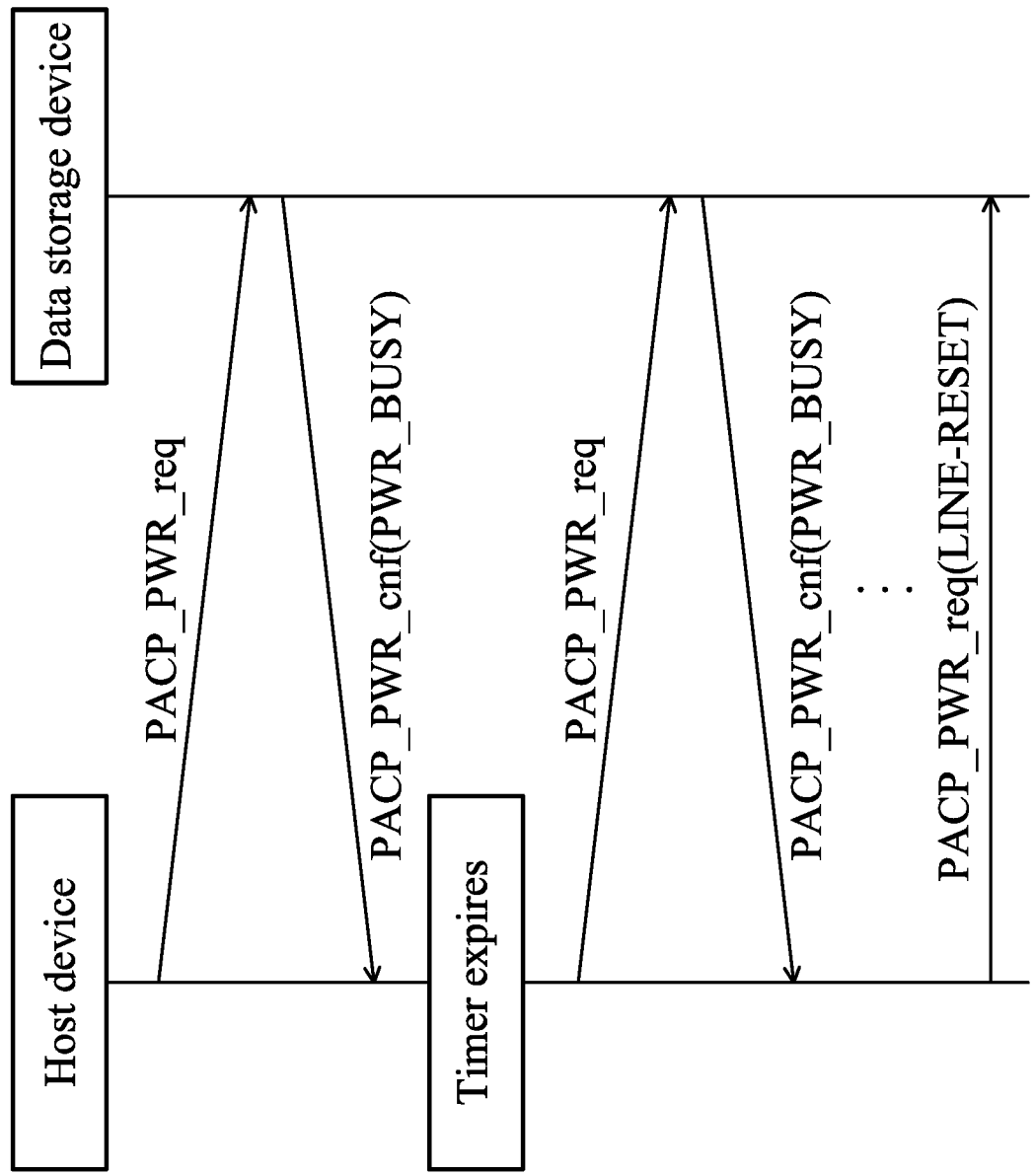
FIG. 6 shows an exemplary message flow for setting the data transfer speed of the predetermined interface according to an embodiment in a second aspect of the invention.

FIG. 6 shows an exemplary message flow for setting the data transfer speed of the predetermined interface according to an embodiment in a second aspect of the invention. First of all, the host device (for example, the processor 210) transmits a power mode change request packet PACP_P-WR_req to the data storage device via the predetermined interface, to request to change the data transfer speed of the predetermined interface from a first speed to a second speed.

Upon receiving the power mode change request packet PACP_PWR_req, the component in the data storage device (for example, the controller 110A or 110B) determines the current operation status of the data storage device 100.

When the ability of the data storage device 100 matches with (that is, is able to support) the level of data transfer speed assigned by the host device 200 (that is, the second speed requested by the host device 200), but the current operation status of the data storage device 100 is busy, the controller 110A/110B may determine that the requested speed cannot be satisfied. The controller 110A/110B may transmit a power mode change confirm packet PACP_P-WR_cnf to the host device via the predetermined interface for responding to the power mode change request packet PACP_PWR_req.

In the power mode change confirm packet PACP_P-WR_cnf, the controller 110A/110B may set a status field thereof to busy (PWR_BUSY), so as to reject the request issued by the host device 200 for changing the data transfer speed. In addition, according to an embodiment of the invention, the controller 110A/110B may store the data carried in the power mode change request packet PACP_P-WR_req in the SRAM 112, and keep monitoring the operation status of the data storage device 100.

After receiving the power mode change confirm packet PACP_PWR_cnf which indicated that power mode change request was rejected, the host device 200 may set up a timer. When the timer expires but the host device has not received any power mode change request packet PACP_PWR_req or has not received any power mode change confirm packet with a status field set to request accept, the processor 210 may transmit a power mode change request packet PACP_PWR_req, again, to the data storage device 100, so as to request to change the data transfer speed of the predetermined interface from a first speed to a second speed.

The procedure may be repeatedly performed within a predetermined time period, or may be set to be performed for a predetermined times. When the processor 210 has not received any power mode change request packet PACP_P-

WR_req or has not received any power mode change confirm packet with a status field set to request accept within the predetermined time period or after performing the procedure for the predetermined times, the processor 210 may perform a reboot process to reboot the data storage device. For example, the processor 210 may transmit a power mode change request packet PACP_PWR_req to initiate the reboot process. In the power mode change request packet PACP_PWR_req, the line reset flag (LINE-RESET) may be set, so as to request the data storage device 100 to perform a reboot procedure.

Besides transmitting the power mode change request packet PACP_PWR_req, the processor 210 may also perform a line reset process by itself to pull down the voltages at the differential signal lines TX_P and TX_N on the transmission path TX, or perform a hardware reset process for controlling the data storage device 100 to perform a reboot process and reestablish the connection with the data storage device 100.

Unlike the conventional design in which the data storage device 100 must unconditionally accept and cannot refuse the power mode change request as long as the data storage device 100 is able to support the data transfer speed requested by the host device 200 to be adjusted, in the embodiments in the first and second aspects of the invention, the data storage device 100 can determine whether to refuse or reject the power mode change request issued by the host device 200 first according to the current operation status, and then adjust the data transfer speed to the level as requested by the host device 200 later at some appropriate time (for example, after leaving the busy status).

In addition, unlike the conventional design in which the data transfer speed can only be determined and controlled by the host device 200, in the embodiments of the invention, the data storage device may also determine and control the data transfer speed, and is allowed to transmit the power mode change request packet PACP_PWR_req to request to adjust the data transfer speed.

In this manner, not only the data transfer speed can be efficiently controlled, but also the undesired problems of data processing congestion, transmission suspension, or unexpected access errors occurred due to improper data transfer speed setting or improperly forcing the data storage device 100 to adjust the data transfer speed can be avoided.

In one example, when the host device 200 transmits a power mode change request to increase the data transfer speed at the time when the data storage device 100 is performing some memory management procedure, such as a garbage collection, moving data block or erasing data, in the background, the data storage device 100 may refuse the power mode change request first according to the embodiments of the invention. After the operations of memory management have been completed, the data storage device 100 may accept the power mode change request by using the methods described above according to the embodiments of the invention. For example, the data storage device 100 may transmit another power mode change request packet to the host device 200 to request to adjust the data transfer speed to the speed previously requested by the host device 200, or may transmit another power mode change confirm packet with the status field set to request accept to the host device 200.

In another example, when the utilization of the SRAM 112 of the data storage device 100 is higher than a predetermined buffer threshold, the remaining memory space of the SRAM 112 may not be sufficient. At this time, if the host device 200 transmits a power mode change request to decrease the data transfer speed, the data storage device 100 may refuse the power mode change request first according to the embodiments of the invention, use the original data transfer speed to transmit out the data stored in the SRAM 112, and then after the data stored in the SRAM 112 have been transmitted out, accept the power mode change request by using the methods described above according to the embodiments of the invention.

Note that in the embodiments in the first and second aspects of the invention, the controller 110A/110B sets the status field as busy (PWR_BUSY) so as to reject or refuse the request transmitted by the host device 200 when the host device 200 requests to change the data transfer speed. That is, in the embodiments in the first and second aspects of the invention, the purpose of setting the status field as busy (PWR_BUSY) is to reject or refuse the request of changing the data transfer speed, not to reject or refuse the request transmitted by the host device 200 for entering a power-saving mode. Therefore, the purpose and the method of rejection or refusal in the embodiments of the invention is different from and should not be read as the rejection or refusal made by the data storage device when the host device transmits the power mode change request packet to request to set the transmission power mode (TxMode) or the reception power mode (RxMode) to the hibernate mode.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A host device, coupled to a data storage device via a predetermined interface, comprising:
a processor, accessing data stored in the data storage device via the predetermined interface; and
a signal processing device, performing signal processing on the data,
wherein the processor transmits a first power mode change request packet to the data storage device via the predetermined interface, to request to change a data transfer speed of the predetermined interface from a first speed to a second speed;
the processor receives a first power mode change confirm packet via the predetermined interface from the data storage device, and
in response to the first power mode change confirm packet, the processor determines to keep the data transfer speed at the first speed and does not change the data transfer speed to the second speed.

2. The host device as claimed in claim 1, wherein when the processor determines that a status field in the first power mode change confirm packet is set to busy, the processor determines to keep the data transfer speed at the first speed and does not change the data transfer speed to the second speed.

3. The host device as claimed in claim 1, wherein after receiving the first power mode change confirm packet, the processor further receives a second power mode change request packet, requesting to change the data transfer speed from the first speed to the second speed, from the data storage device via the predetermined interface.

4. The host device as claimed in claim 1, wherein after receiving the first power mode change confirm packet, the processor further transmits a third power mode change request packet, requesting to change the data transfer speed from the first speed to the second speed, to the data storage device via the predetermined interface.

5. The host device as claimed in claim 1, wherein when the processor has not received a second power mode change request packet or a second power mode change confirm packet with a status field set to request accept from the data storage device within a predetermined time period, the processor performs a reboot process to reboot the data storage device.

6. The host device as claimed in claim 1, wherein the processor determines to transmit the first power mode change request packet according to a data processing speed required by the signal processing device.

7. The host device as claimed in claim 1, wherein the data storage device comprises a Universal Flash Storage (UFS), and the predetermined interface is a UFS interface.

8. A method for controlling data transfer speed, comprising:
   Transmitting, by a processor, a first power mode change request packet to a data storage device via a predetermined interface, to request the data storage device to change a data transfer speed of the predetermined interface from a first speed to a second speed;
   Receiving, by a processor a first power mode change confirm packet via the predetermined interface from the data storage device by the processor; and
   in response to the first power mode change confirm packet, keeping the data transfer speed at the first speed and not changing the data transfer speed to the second speed.

9. The method as claimed in claim 8, further comprising:
   determining content of a status field of the first power mode change confirm packet, wherein when the status field in the first power mode change confirm packet is set to busy, keeping the data transfer speed at the first speed and not changing the data transfer speed to the second speed.

10. The method as claimed in claim 8, further comprising:
    after receiving the first power mode change confirm packet, receiving, by the processor, a second power mode change request packet, which requesting to change the data transfer speed from the first speed to the second speed, from the data storage device.

11. The method as claimed in claim 8, further comprising:
    after receiving the first power mode change confirm packet, transmitting, by the processor, a third power mode change request packet, which requesting to change the data transfer speed from the first speed to the second speed, to the data storage device.

12. The method as claimed in claim 8, further comprising:
    Performing, by the processor, a reboot process to reboot the data storage device when a second power mode change request packet or a second power mode change confirm packet with a status field set to request accept has not been received by the processor from the data storage device within a predetermined time period.

13. The method as claimed in claim 8, wherein the data transfer speed comprises a transmission speed for a host device to transmit data to the data storage device and a reception speed for the host device to receive data from the data storage device.

14. The method as claimed in claim 8, wherein the data transfer speed is the data transfer speed of a UFS interface.

* * * * *